July 26, 1938.    O. WITTEL    2,124,938
TAKE-UP AND REWIND ASSEMBLY FOR MOTION PICTURE PROJECTORS
Filed Dec. 17, 1936    4 Sheets-Sheet 1
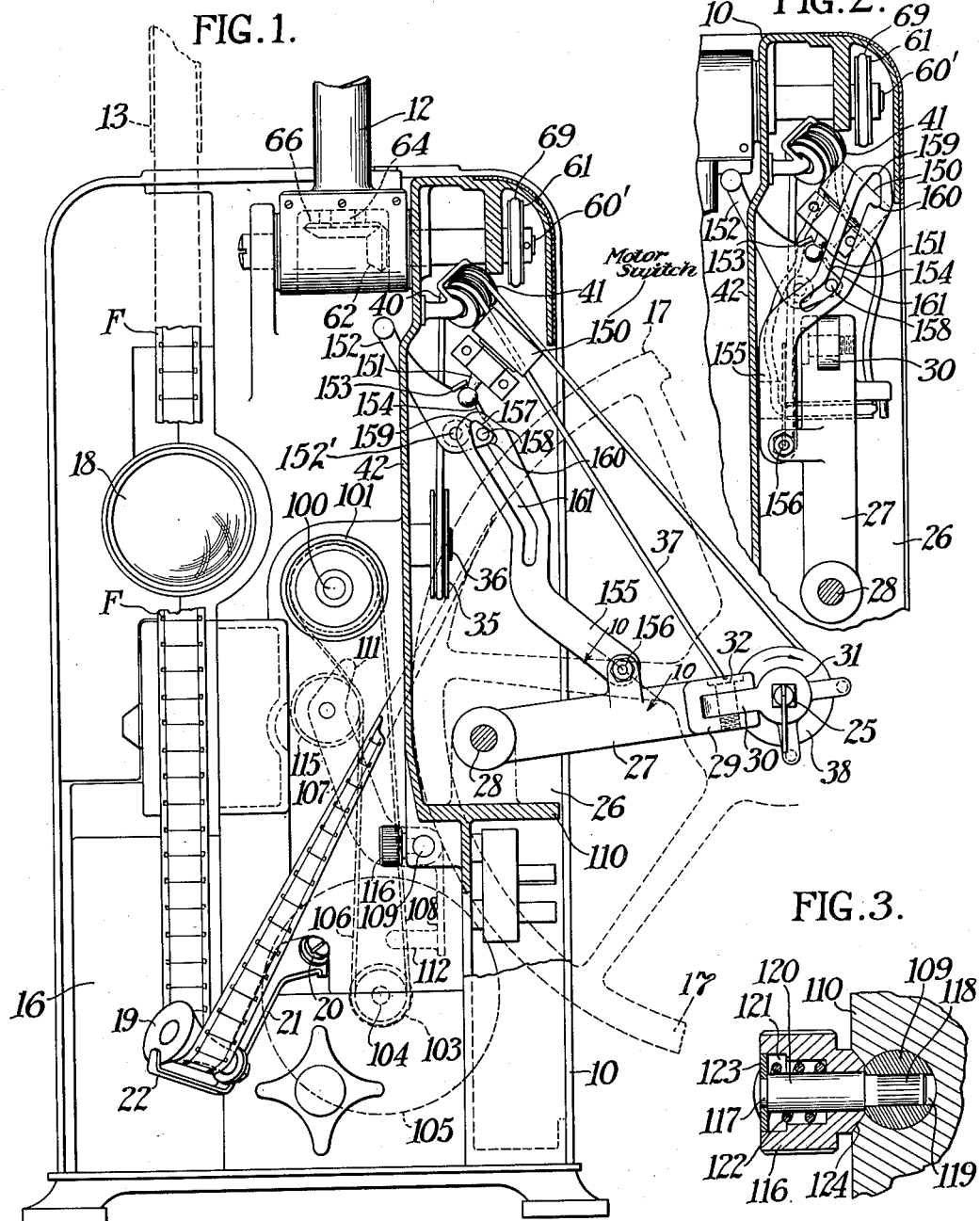
Otto Wittel
INVENTOR.
BY Newton M. Perrins
Donald H. Stewart.
ATTORNEYS July 26, 1938.　　　　　O. WITTEL　　　　2,124,938
TAKE-UP AND REWIND ASSEMBLY FOR MOTION PICTURE PROJECTORS
Filed Dec. 17, 1936　　　4 Sheets-Sheet 2

Otto Wittel
INVENTOR.

BY Newton M. Perrins
Donald K. Stewart
ATTORNEYS

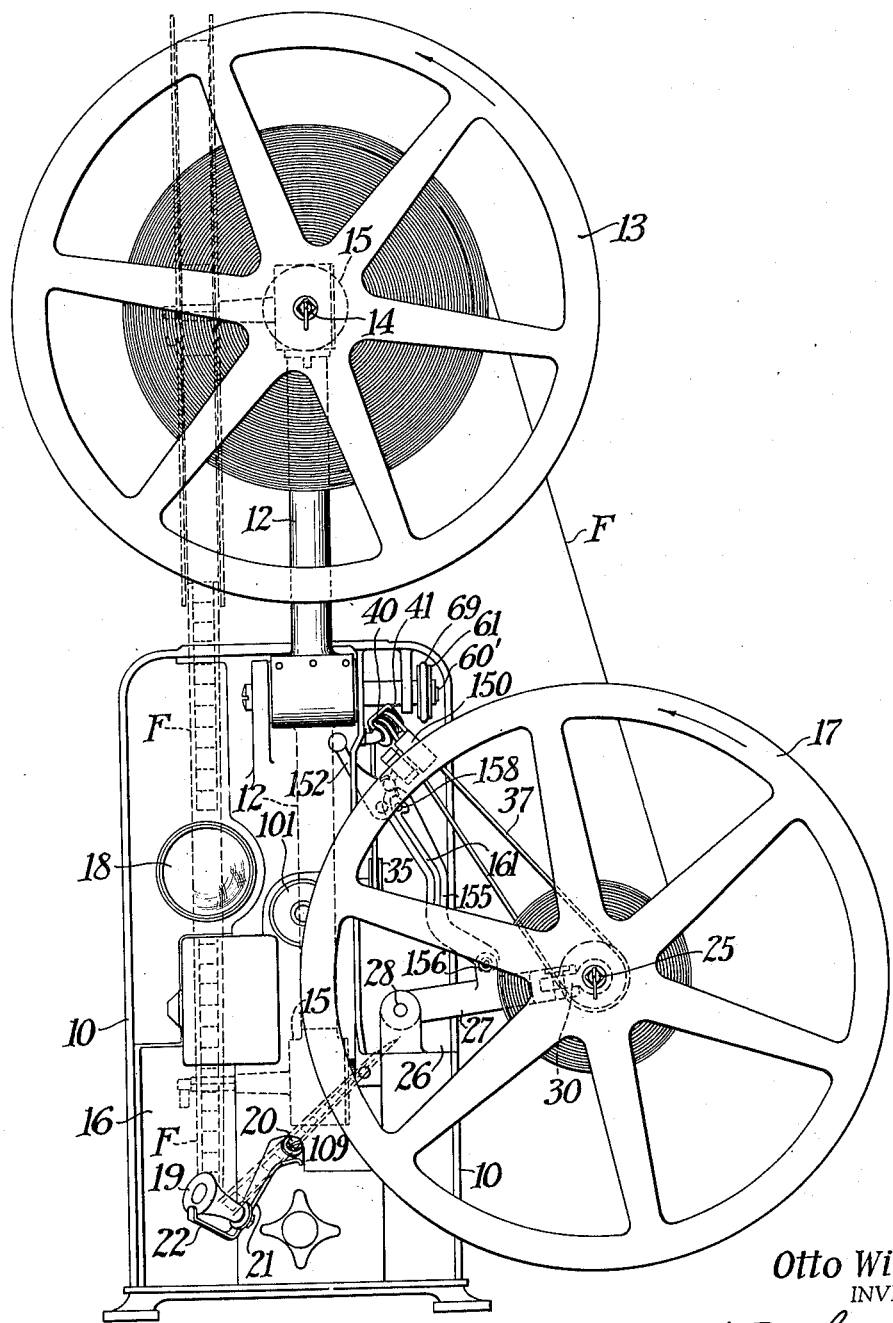

July 26, 1938.　　　　　O. WITTEL　　　2,124,938
TAKE-UP AND REWIND ASSEMBLY FOR MOTION PICTURE PROJECTORS
Filed Dec. 17, 1936　　4 Sheets-Sheet 4
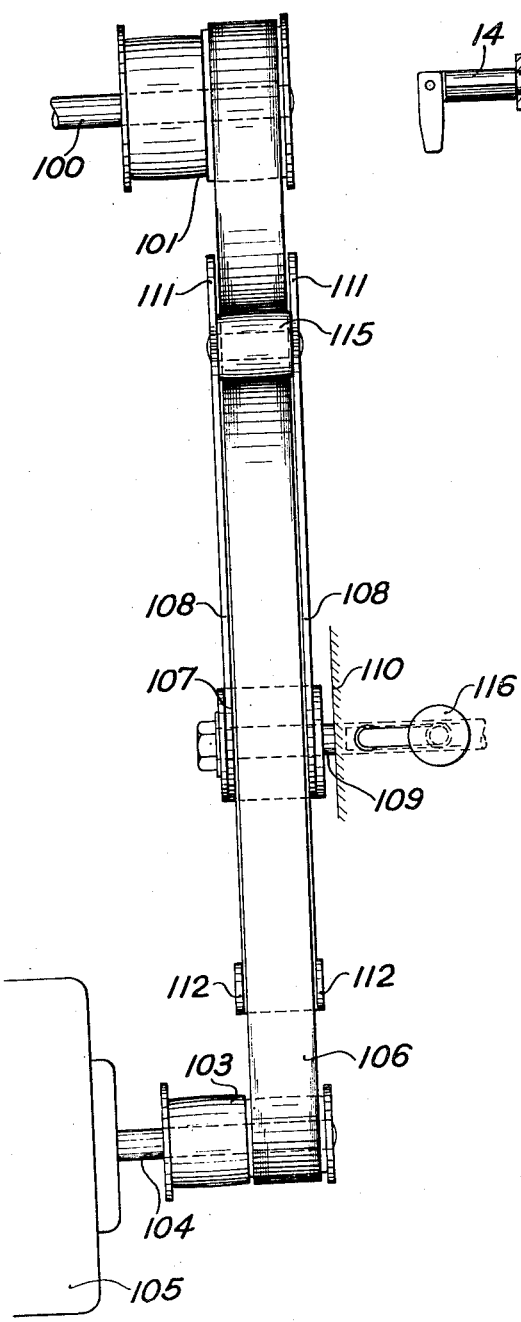
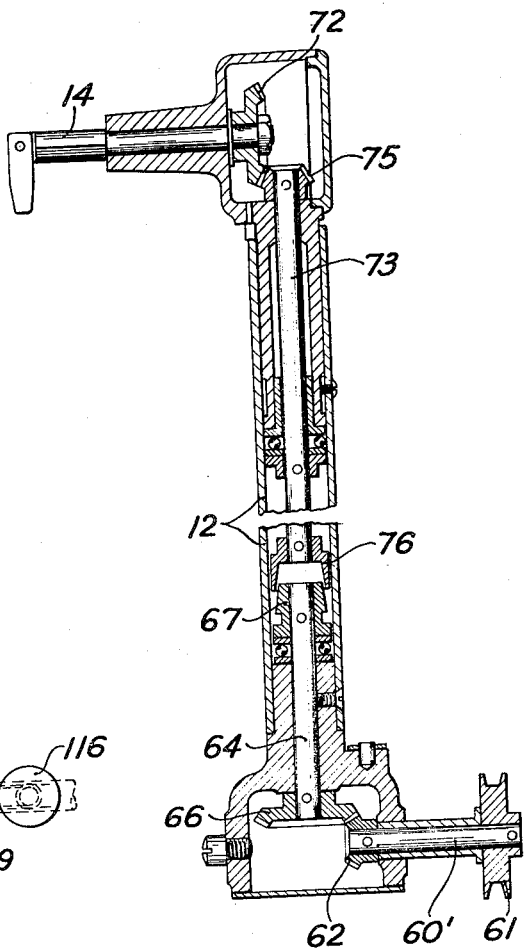
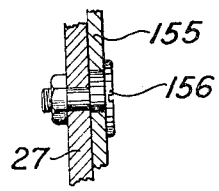
Otto Wittel
INVENTOR
BY
ATTORNEYS Patented July 26, 1938

2,124,938

UNITED STATES PATENT OFFICE 2,124,938

TAKE-UP AND REWIND ASSEMBLY FOR MOTION PICTURE PROJECTORS

Otto Wittel, Rochester, N. Y., assignor to Eastman Kodak Company, Rochester, N. Y., a corporation of New Jersey Application December 17, 1936, Serial No. 116,362

12 Claims. (Cl. 242—55)

This invention relates to motion picture projectors wherein the take-up reel is frictionally driven and normally supported by its driving means, and particularly to a control means by means of which the frictional engagement between the take-up reel and its driving means can be relieved during rewinding, said control means also serving to start and stop the rewinding operation.

It is old in the art to mount the take-up reel of a projector in such a way that it is normally supported by a belt which serves as a driving means therefor. In a projector wherein the take-up reel is mounted in this manner, the frictional contact between the take-up reel driving member, usually a pulley, and the belt varies with the amount of film contained on the reel, a feature which makes this method of mounting a frictionally driven take-up reel very advantageous. It is obvious that when large reels are used on a projector, i. e., 1,600 ft., wherein the combined weight of the reel and the film contained thereon may amount to as much as 8 to 10 pounds, the frictional contact between the pulley connected to the reel and the belt can become quite significant.

When rewinding on a projector of this type, the frictional contact between the take-up reel and its driving belt becomes a drag which has to be overcome, and this frictional drag in combination with the moment of inertia of the reel and its contents will place an unbearable strain on the film strip between the supply reel and the take-up reel unless some means are provided for relieving the frictional drag of the driving belt.

Another disadvantage found in rewinding when the take-up reel is pivotally mounted to float and be supported by a driving belt, arises from the fact that when the drive is first switched to the supply reel, before the combined moment of the take-up reel and the drag thereon caused by the belt can be overcome, the take-up reel tends to fly upwardly due to the pull of the film. Although this tendency is greatest at the beginning of the rewinding operation, it is prevalent throughout the rewinding operation pending a momentary catch in the free movement of the take-up reel. When the take-up reel does fly upwardly for any reason, and then is quickly released, a slack is allowed in the film strip between the two reels which allows the take-up reel to drop back down suddenly, until it is supported again by the driving belt therefor. This sudden rise and fall of the take-up reel places a sudden shock on the film strip between the two reels which may, or may not be great enough to snap it depending upon the magnitude of the rise and fall of the take-up reel.

It is also necessary in a projector wherein a so called floating take-up reel is supported by the driving belt therefor to provide a supplementary supporting means for the reel which will take effect in the event that the driving belt breaks or jumps a pulley.

Therefore, one object of my invention is to provide a motion picture projector, wherein the take-up reel is pivotally mounted to float and be normally supported by a driving belt, with a connecting means between the take-up reel and the lever for starting and stopping the rewinding operation, by means of which the frictional drag on the take-up reel caused by the belt can be relieved during rewinding.

Another object is to provide a means for preventing the take-up reel from flying upwardly during rewinding in the event a momentary drag is placed on the take-up reel.

And still another object is to provide a supplementary supporting means for the take-up reel which will become effective only in case the driving belt normally supporting the reel should break or jump a pulley.

I have shown my invention incorporated on a motion picture projector shown and described in pending U. S. application Serial No. 74,330 in the name of E. C. Fritts, now Patent No. 2,099,299 of November 16, 1937 wherein the take-up reel is pivotally mounted on the projector housing to float and be normally supported by the belt driving the same.

Briefly my invention comprises a motion picture projector wherein the take-up reel is journalled on an arm which is pivotally mounted to the projector housing so as to be normally supported by a belt which drives the take-up reel. The starting and stopping of the rewind mechanism is controlled by moving a lever pivoted to the housing of the projector. The arm on which the take-up reel is mounted is connected to the lever by a bracket, said bracket being pivoted to the arm, and having a pin and slot connection with the lever. The bracket, through its pin and slot connection with the lever, is adapted to serve three functions, namely: as a supplementary supporting means for the take-up reel should the driving belt normally supporting the reel break or jump off of a pulley; to allow the movement of the lever beyond its rewind starting position to raise the take-up reel and relieve the frictional drag between the reel and its driving belt; and to prevent the take-up reel from flying upwardly during rewinding. The pin and slot connection between the lever and the bracket also allows the pivoted take-up arm to be folded within the projector housing without necessitating a disconnection of the several parts.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

Fig. 1 is a front elevation of a motion picture projector, with certain parts broken away to show the preferred form of my invention, Fig. 2 is a partial view of Fig. 1 and showing the take-up spindle folded into carrying position within the projector housing, Fig. 3 is an enlarged detail of the button for actuating the belt shifter indicated in Fig. 1.

Fig. 4 is a partial side elevation of the projector showing the take-up spindle folded into the projector housing, Fig. 5 is a partial side elevation of the projector showing the take-up spindle supported by its driving belt, and showing the position of the rewind motor for driving the supply spindle, Fig. 6 is an enlarged side elevation of the rewind switch and its operating lever, and showing the lever in the position wherein it has assumed control of the bracket pivoted to the take-up spindle arm so that the take-up spindle has been raised to relieve the frictional drag thereon due to the driving belt, and Fig. 7 is front elevation of the projector showing the supply reel in rewind position.

Fig. 8 is an enlarged end elevation of the belt shifter, with parts of the projector omitted for purposes of clarity; and showing the fingers on the shifter as well as the two step cone drive pulleys over which the shifter moves the belt.

Fig. 9 is an enlarged section through the support for the supply reel and the housing enclosing the rewind drive mechanism clearly showing the driving connection between the rewind motor and the supply spindle.

Fig. 10 is an enlarged section taken on line 10—10 of Fig. 1 and showing the eccentricity of the stud 156.

Like reference characters refer to corresponding parts through the several figures.

Figure 4:
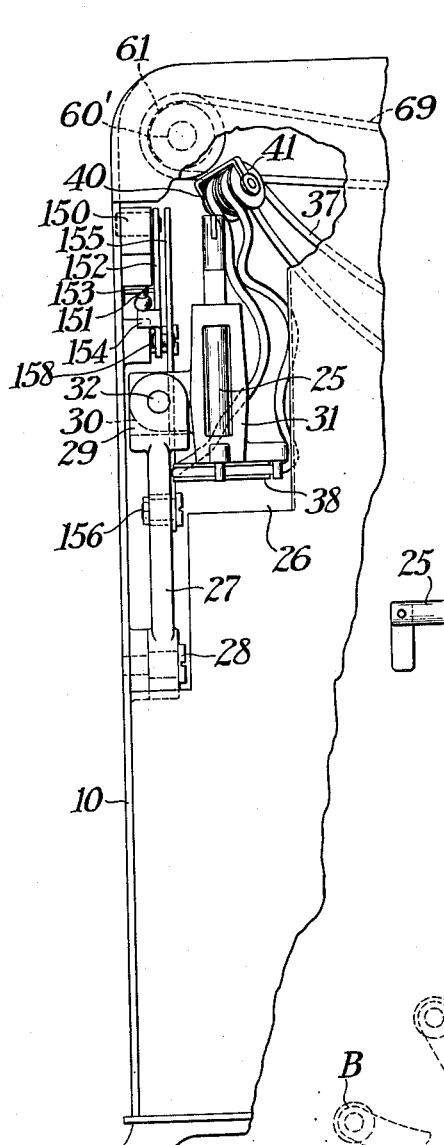

Referring now to Fig. 1, wherein a preferred embodiment of my invention is shown, 10 represents the housing of the projector, preferably within which is arranged the film feeding, light controlling, and other kindred mechanisms usual to a projection apparatus.

A tubular support 12 for the supply reel 13 is rotatably mounted on the projector housing 10 so that it can be folded down against the housing, as shown by the dotted position thereof in Fig. 7, the supply spindle 14 and its associated gear housing 15 being received in the recess 16 of the projector housing.

The supply spindle 14 is suitably mounted on top of the support 12 so that it can be swung through 90° from a projecting position wherein it is at right angles to the take-up reel, to a rewind position, see Fig. 7, wherein it is in alignment with the take-up reel 17 so that rewinding of the film F can take place directly from reel to reel externally of the housing. For rewinding purposes, the drive for the supply spindle includes rewind motor 60, driving belt 69, pulley 61, shaft 60' and bevel gears 62 and 66, see Figs. 1, 7 and 9. Bevel gear 66 is fixed to the end of a power shaft 64 which extends into the end of the tubular support 12, the end of the shaft 64 within the support 12 having a male clutch member, 67, fixed thereto. The supply spindle 14 has a bevel gear 72 fixed thereto which engages another bevel gear 75 fixed to the drive shaft, 73, which extends into the upper end of the support 12, and has on its end a female clutch member, 76, which is adapted to engage the above mentioned male clutch member 67 when the supply spindle is in its rewind position to connect the spindle with the drive from the rewind motor 60, as will be understood by referring to Fig. 9. The supply spindle 14 is so mounted atop the support 12, that when it is rotated between its rewind and projecting positions the drive connection between it and the rewind motor is automatically effected or broken by causing the female clutch member 76 to be moved into or out of engagement with the male clutch member 67 respectively. In Fig. 9 the support 12 is shown rotated to the position where the supply spindle 14 is in projecting position hence the female clutch member 76 is removed from engagement with the male clutch member 67 and the supply spindle is allowed to rotate idly. It necessarily follows that when the support 12 is rotated to the position shown in Fig. 7, wherein the supply spindle 14 is in position for rewinding, that the female clutch member 76 drops down in the support 12 to engage the male clutch member 67 whereby the supply spindle is driven to pull the film from the take-up reel 17. A detailed description of the mounting of this supply spindle can be had by referring to said pending U. S. application 74,330 to E. C. Fritts, Patent No. 2,099,299 but in as much as this feature forms no part of my invention a detailed description will be dispensed with in this specification.

In its take-up position, the take-up reel 17 is mounted to one side of and at right angles to the objective 18 and the film path of the projector so that the film F on leaving said film feeding mechanism has to be turned through 90 degrees to be guided onto the take-up reel. In order to provide this 90° turn in the film path, a guide roller 19 which is movably mounted on the housing 10 by screws 20 and bracket 21 is provided, said bracket being formed as at 22 to enclose one side of the roller to prevent the film from running off thereof.

The take-up spindle 25 is so mounted on the projector housing 10 that it is adapted to be folded and swung into a recess 26 in the housing for carrying purposes, see Figs. 2 and 4. The mounting for the take-up reel comprises an arm 27 which is rotatably pinned at one end to the housing 10 by the bolt 28. The other end of the arm 27 provides a yoke member 29 into which a lug 30 on the take-up spindle casing 31 projects and is rotatably confined by a tie bolt 32 passing through the two. Therefore, by virtue of the described mounting, the take-up spindle 25 is adapted to be folded into the carrying position shown most clearly in Fig. 4.

Those parts of the projector described up to this point are identical with the corresponding parts of the projector shown in said pending application Serial No. 74,330, Patent No. 2,099,299 and the reference characters used in the present specification have been made to correspond to the reference characters used in the referred to pending application wherein a detailed description of the parts and their function may be found.

Figure 5:
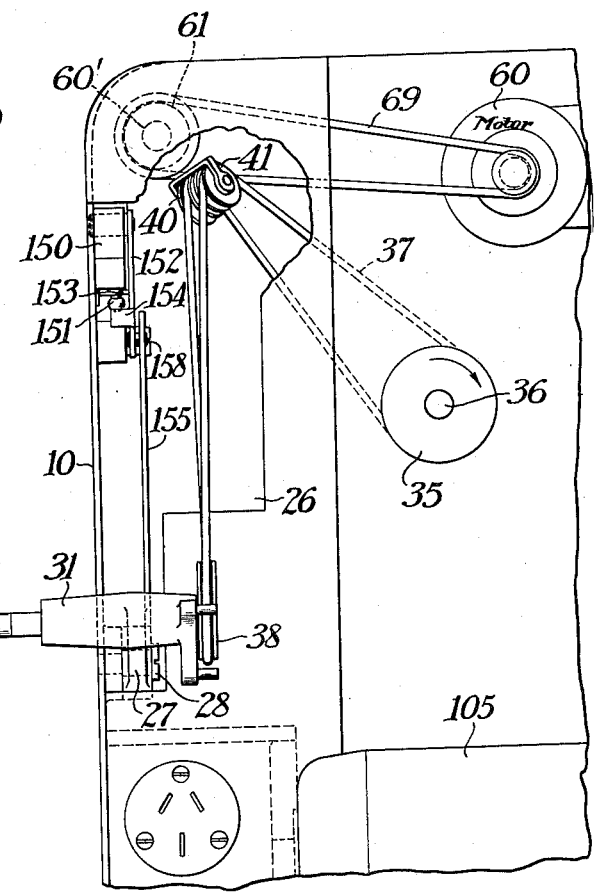

To drive the take-up spindle, a pulley 35 is fastened to a shaft 36 which is journalled in the housing 10, see Fig. 5. Shaft 36 is in turn geared, in any suitable manner, not shown, to shaft 100 which is journalled in the housing at right angles to shaft 36, see Fig. 1. Referring to Figs. 1 and 9, a two step cone pulley 101 is fixed to the end of shaft 100, and is driven from another two step cone pulley 103, fixed to the end of the drive shaft 104 of the motor 105, mounted in the housing 110, by means of belt 106. In order to shift the belt 106 on the pulleys 101 and 103, a belt shifter, indicated broadly as, 107, is provided. This belt shifter, comprises a pair of arms 108 mounted in spaced parallel relation on a pin 109 which is slidably mounted in a bore in the partition 110 whereby the arms are adapted to engage the belt 106 on opposite edges. The arms 108 are provided with two sets of belt engaging fingers 111 and 112, fingers 111 engaging the belt adjacent pulley 101, and fingers 112 engaging the belt adjacent the pulley 103 so that an even pressure is applied to the belt in shifting from one speed to another, thereby overcoming the necessity for the belt to climb from one pulley to another as is the case where well known localized belt shifters are used. A guide roller 115 is journalled between the parallel arms 108 to act as a guide and tensioning members for the belt.

The belt shifter 107 is actuated by pressing in or pulling out the button 116. Referring now to Fig. 3, stud 117, having a burred end 118, is driven into a hole 119 in the pin 109 so that it is prevented from turning therein. The stud 117 has an enlarged central portion 120 on which the button 116 is slidably and rotatably mounted. Button 116 is provided with a stepped recess 121, in which a coiled spring 122, encircling the stud 117, is adapted to be seated. A disc 123 is fixed to the end of the stud to maintain the spring 122 in place wherein it normally forces the button 116 towards the partition 110 whereby a tapered end 124 of the button is adapted to be seated in a recess in the partition to hold the belt shifter in any given position. When it is desired to move the belt shifter, button 116 is pulled outward against the spring 122 until the disc 123 engages the reduced portion of the recess 121, whereupon the button is removed from the recess in the partition and the shifting pin 109 can be slid one way or another.

The take-up spindle 25 is driven from the pulley 35 by a belt 37 which passes from pulley 35 over pulley 38 which is fixed to the take-up spindle. Due to the relative positions of the driving pulley 35, and the pulley 38 on the take-up spindle when said spindle is in its take-up position, and in order to allow the take-up reel 17 to float with respect to its pivot point 28 so that the weight of the film on the reel can control the friction in the driving belt during take-up, I mount a pair of guide pulleys 40 and 41 on the housing 10. These pulleys are angularly mounted so that they properly change the direction of the driving belt 37 in order to effect a proper power transmission to the take-up spindle from the main source of power, the motor 105. The pulleys 40 and 41 also serve to direct the belt 37 so that it suspends the take-up spindle 25 whereby the belt friction will be controlled by the change in weight of the take-up reel.

The particular construction of the projector described up to this point is for the most part old in the art, a detailed description thereof being made in pending application Serial No. 74,330, Patent No. 2,099,299 referred to above, and has been merely used to illustrate a type of projector on which my invention, to be described hereinafter, is particularly adapted.

A rewind switch 150 is mounted in the recess 26 in the housing 10, said switch controlling an electric circuit for starting and stopping of the rewind motor 60 which is connected to the supply spindle as above described. The switch 150 is provided with a toggle lever 151 which has a round head, for the purpose hereinafter described. A controlling lever 152 is pivoted at 152′ to the housing 10, and this lever extends through a slot in the partition 42, forming one wall of the recess 26, so that it is easily accessible for operation.

The controlling lever 152 is provided with upstanding lugs 153 and 154 which engage opposite sides of the toggle lever 151 when the controlling lever 152 is in the position shown in Figs. 1 and 2 wherein the rewind switch is shut off. When lever 152 is pulled downward, to the dotted position B, see Fig. 6, lug 154 engages the toggle lever 151 and closes the switch 150. When rewinding is completed, controlling lever 152 is returned to its inoperative position and in so moving, lug 153 thereon engages the toggle lever 151 and opens the switch 150. Bracket or strap 155 has one end pivoted to the take-up arm 27 by means of an eccentric stud 156, see Fig. 10 for purposes hereinafter described. The other end of the bracket is provided with an elongated slot 157 which engages a pin 158 mounted on the end of controlling lever 152. As shown in Figure 1, when the controlling lever 152 is in its inoperative position the pin 158 thereon is midway between the ends of the slot 157 to allow a given amount of movement to the lever 152 before said lever assumes control of the take-up arm 27 through the bracket 155. When rewinding is desired, lever 152 is moved to the dotted position B such movement being sufficient to cause lug 154 on the lever to engage toggle lever 151 and close the rewind switch 150. The length of the slot 157 is such that the pin 158 on the lever 152 moves only to the end 159 thereof, when the lever 152 is moved a sufficient distance to close the switch.

Figure 6:
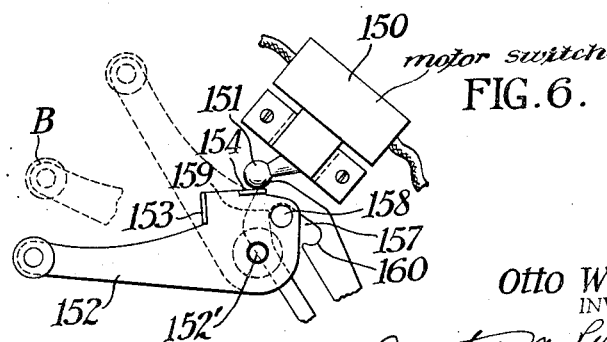

In order to remove the frictional drag between the driving belt 37 and the pulley 38 on the take-up spindle 25 during the rewinding operation, controlling lever 152 is moved to and held in its lowest position shown in Fig. 6 wherein the pin 158 on the lever has assumed control of the bracket 155 to lift the take-up arm 27 and its associated mechanism. After sufficient film has been removed from the take-up reel 17, the controlling lever 152 can be released by the operator to allow it to return to the position B under the action of the weighted arm 27 acting through bracket 155, in which position the switch 150 is left closed so that rewinding can continue until finished. It will be noted by referring to Fig. 6 that when the controlling lever 152 is moved to its lowest position, the lug 154 is adapted to cam itself past the rounded head on the toggle lever 151.

If at the start or during rewinding the take-up arm 27 and its associated mechanism tend to fly upwardly due to a momentary drag between the film strip and the take-up reel 17, the pin 158 will engage the end 160 of the slot 157 to prevent such an upward movement of the take-up arm. A slight amount of upward movement is allowed the take-up arm and its associated mechanism by virtue of the pin and slot connection between the bracket 155 and the pin 158 to account for momentary shocks to which the film strip might be subjected during rewinding, but said pin and slot connection is such as to prevent the take-up reel from flying upwardly to a position from which a drop would induce a sufficient shock upon the film strip to rupture the same. In order to change the effective length of the bracket 155, the pivoted connection between it and the take-up arm 27 has been made with an eccentric stud 156 an adjustment of which will shift the bracket in a direction to change the relative positions of the slot 157 and the pin 158, see Fig. 10. By means of this adjustment the pin and slot connection 157 and 158 can be so altered as to make the controlling lever 152 assume control of the bracket 156 at any position of its movement that may be desired.

In order to allow the take-up arm and its associated mechanism to be folded within the recess 26 for carrying purposes, as shown in Figs. 2 and 4, without necessitating a disconnection of the bracket 155 and the control lever 152, I have provided the bracket 155 with an elongated slot 161 which connects with elongated slot 157. When it is desired to fold the arm 27 into the recess 26, the bracket 155 is raised by the operator with his finger to guide the pin 158 into the slot 161 after which said pin will travel in the slot 161 as the arm 27 is folded up, and will assume a position as shown in Fig. 2.

Bracket 155 in addition to serving the purposes already described, also serves as a supplementary supporting means for the take-up arm and the take-up reel thereon in the event the driving belt 37 breaks or jumps a pulley. By virtue of the pin and slot connection 158 and 157 between the bracket and the control lever 152, the take-up arm 27 and the reel 17 thereon is allowed to float over a range whereby the driving belt 37 normally acts as the sole means of support for the arm and reel thereon. However, if the belt 37 should break or jump a pulley, the arm 27 will only drop until the pin 158 engages the end 159 of the slot 157 whereupon the bracket 155 becomes the support for the take-up arm and the reel thus preventing it from dropping down against the projector housing 10.

Although I have shown and described certain specific embodiments of my invention, I am aware that many modifications of the same are possible. My invention, therefore, is not to be restricted except in so far as is necessitated by the prior art and by the spirit of the appended claims.

Having thus described my invention, what I declare is new and desire to secure by Letters Patent is:

1. A motion picture projector comprising a support, a supply reel mounted thereon, a take-up arm pivotally mounted on the support, a take-up spindle journalled on said arm, a take-up reel mounted thereon, frictional driving means for the take-up spindle normally supporting the take-up arm and its associated parts whereby the frictional engagement between the spindle and the driving means therefore varies with the weight of film on the take-up reel, rewinding mechanism on the support for driving the supply spindle while the take-up spindle is idle, a pivoted lever on the support, a means connecting said lever and the take-up arm whereby the arm is prevented from flying upwardly during rewinding and the take-up arm may be raised by moving said lever to relieve the frictional engagement between the take-up spindle and its driving means, said means including a strap having one end connected with said lever and the other end pivoted to the take-up arm, the normal effective length of said strap being insufficient to supplement the frictional driving means as a support for the take-up arm and its associated parts.

2. A motion picture projector comprising a support, a supply reel mounted on said support, a take-up spindle pivotally mounted on one side of said support, a take-up reel mounted thereon, means for frictionally driving said take-up spindle, said means normally supporting the weight of the spindle and the take-up reel thereon, mechanism on said support for effecting a rewinding of a film strip from the take-up reel to the supply reel, a lever for starting and stopping the rewinding mechanism, and a connection between said lever and the take-up spindle whereby the frictional engagement between the take-up spindle and its driving means can be relieved by moving said lever.

3. A motion picture projector comprising a support, a supply reel mounted on said support, a take-up spindle pivotally mounted on one side of said support, a take-up reel mounted thereon, means for frictionally driving said take-up spindle, said means normally supporting the weight of the spindle and the take-up reel, rewinding mechanism on the support for driving the supply reel while the take-up spindle is idle, a lever for starting and stopping said rewinding mechanism, and a connection between said lever and the take-up spindle whereby the take-up spindle may be raised by moving the lever, and the take-up spindle may be prevented from flying upward during rewinding.

4. A motion picture projector comprising a housing, a supply reel mounted thereon, a take-up arm pivotally mounted on the side of said housing, a take-up spindle journalled on said arm, a take-up reel on said spindle, means for frictionally driving the take-up spindle, said means normally supporting the weight of the spindle and the take-up reel thereon whereby the driving friction varies with the amount of film on the reel, a rewind mechanism for driving the supply reel, a control lever for starting and stopping the rewind mechanism, and a bracket having one end pivoted to the take-up arm, and other end connected to the control lever whereby the arm and the take-up spindle may be raised by moving the lever to relieve the frictional engagement between the take-up spindle and its driving means.

5. A motion picture projector comprising a housing, a supply reel mounted thereon, a take-up arm pivotally mounted on the side of said housing, a take-up spindle journalled on said arm, a take-up reel on said spindle, means for frictionally driving the take-up spindle, said means normally supporting the weight of the spindle and the take-up reel thereon whereby the driving friction varies with the amount of film on the reel, a rewind mechanism for driving the supply reel, a control lever for starting and stopping the rewind mechanism, a pin on said control lever, and means connecting the control lever and the take-up arm whereby the take-up arm is prevented from flying upward during rewinding and said arm can be raised upon movement of the control lever to relieve the frictional engagement between the take-up spindle and its driving means, said means including, a bracket having one end slotted to engage the pin on the control lever, the other end of said bracket being pivoted to the take-up arm.

6. A motion picture projector comprising a housing, a supply reel mounted thereon, a take-up arm pivotally mounted on the side of said housing, a take-up spindle journalled on said arm, a take-up reel on the spindle, a pulley fixed to the end of said spindle, a belt engaging the pulley for driving the spindle, said belt normally supporting the take-up arm and its associated parts whereby the frictional engagement between the pulley and the belt varies with the weight of the take-up reel, a rewind mechanism for driving the supply reel, a control lever for starting and stopping the rewind mechanism, and means connecting said control lever and said take-up arm whereby a movement of the lever will raise the take-up arm and relieve the frictional engagement between the take-up spindle and the driving belt, said means including a bracket having one end connected with the control lever, and the other end pivoted to the take-up arm.

7. A motion picture projector comprising a housing, a supply reel mounted thereon, a take-up arm pivotally mounted on the side of said housing, a take-up spindle journalled on said arm, a take-up reel on the spindle, a pulley fixed to the end of said spindle, a belt engaging the pulley for driving the spindle, said belt normally supporting the take-up arm and its associated parts whereby the frictional engagement between the pulley and the belt varies with the weight of the take-up reel, a rewind mechanism for driving the supply reel, a control lever for starting and stopping the rewind mechanism, and means connecting said control lever and said take-up arm whereby a movement of said lever will raise the take-up arm and relieve the frictional engagement between the take-up spindle and the driving belt and will prevent the take-up arm from flying upwardly during rewinding, said means including a pin on the control lever, and a bracket having one end pivoted to the take-up arm, the other end of the bracket having an elongated slot engaging said pin on the control lever.

8. A motion picture projector comprising a housing, a supply reel mounted thereon, a take-up arm pivotally mounted on the side of said housing, a take-up spindle journalled on said arm, a take-up reel on the spindle, a pulley fixed to the end of said spindle, a belt engaging the pulley for driving the spindle, said belt normally supporting the take-up arm and its associated parts whereby the frictional engagement between the pulley and the belt varies with the weight of the take-up reel, a rewind motor in said housing for driving the supply reel, a switch for starting and stopping said motor, a lever pivoted to the housing for operating said switch, a pin on said lever, and means connecting the lever and the take-up arm whereby the arm is prevented from flying upwardly during rewinding and is lifted by moving the control lever, said means including a bracket having one end pivoted to the take-up arm, the other end of the bracket having an elongated slot engaging the pin on the control lever.

9. A motion picture projector comprising a housing, a supply reel mounted thereon, a take-up arm pivotally mounted on the side of said housing, a take-up spindle journalled on said arm, a take-up reel on said spindle, a pulley fixed to the end of said spindle, a belt engaging the pulley for driving the spindle, said belt normally supporting the take-up arm and its associated parts whereby the frictional engagement between the pulley and the belt varies with the weight of the take-up reel, a rewind mechanism for driving the supply reel, a control lever for starting and stopping the rewind mechanism, a pin on said control lever, a supplementary supporting means for the take-up arm including a bracket having one end slotted to engage the pin on the control lever, the other end of the bracket being pivoted to the take-up arm whereby a movement of the control lever is adapted to lift the take-up arm and relieve the frictional engagement between the driving belt and the pulley of the take-up spindle, and means for varying the effective length of the supplementary supporting means with respect to the length of the driving belt, said means including a cam member at the pivot point of the bracket and the take-up arm.

10. A motion picture projector comprising a housing, a supply reel mounted thereon, a take-up arm pivotally mounted on said housing to move between a carrying position wherein it is within the housing to an operative position wherein it is outside the housing, a take-up spindle journalled on said arm adapted to receive a take-up reel, a pulley fixed to the end of said spindle, a belt engaging the pulley for driving the spindle, said belt normally supporting the take-up arm and its associated parts when said arm is in its operative position, a rewind mechanism for driving the supply reel, a control lever for starting and stopping said rewind mechanism, a pin on said control lever, and means connecting the control lever and the take-up arm whereby the take-up arm is prevented from flying upwardly during rewinding, and said arm may be raised upon movement of the control lever to relieve the frictional engagement between the take-up spindle and its driving belt, said means including a bracket having one end slotted to engage the pin on the control lever, and the other end pivoted to the take-up arm.

11. A motion picture projector comprising a housing, a supply reel mounted thereon, a take-up arm pivotally mounted on the side of said housing, a take-up spindle journalled on said arm, a take-up reel on the spindle, a pulley fixed to the end of said spindle, a belt engaging the pulley for driving the spindle, said belt normally supporting the take-up arm and its associated parts whereby the frictional engagement between the pulley and the belt varies with the weight of the take-up reel, an electric motor mounted in said housing and adapted to drive the supply reel for rewinding purposes, a switch for controlling said motor, a control lever pivoted to the wall of the housing adapted to open and close said switch, and means connecting said control lever and said take-up arm whereby a movement of the lever beyond its switch actuating position will raise the take-up arm and relieve the frictional engagement between the take-up spindle and the driving belt, said means including a bracket having one end connected by a pin and slot connection with the control lever, and the other end pivoted to the take-up arm.

12. In a motion picture projector the combination with a support, a supply reel mounted thereon, a take-up arm pivotally mounted on the support, a spindle journalled thereon, a take-up reel on said spindle, frictional driving means for said spindle, said driving means normally supporting the take-up arm and its associated parts whereby the frictional engagement varies with the weight of film on the take-up reel, a rewind mechanism for driving the supply reel, a control lever for starting and stopping said rewind mechanism, of a means connecting the take-up arm and the control lever whereby the arm may be raised upon movement of the lever, the arm is prevented from flying upwardly during rewinding, and the arm is supported thereby upon failure of the frictional driving means to act as a support, said means comprising a bracket having one end connected to the control lever through a pin and slot connection, the other end of said bracket being pivoted to the take-up arm.

OTTO WITTEL.